(12) United States Patent
Lee

(10) Patent No.: US 7,311,161 B2
(45) Date of Patent: Dec. 25, 2007

(54) HOSPITAL BED HAVING A DRIVE WHEEL UNIT

(76) Inventor: Pao-Ling Lee, 4F, No.3, Lane 147, Sec.2, Ming Sheng E. Road, Taipei (TW) 111

( * ) Notice: Subject to any disclaimer, the term of this patent is extended or adjusted under 35 U.S.C. 154(b) by 0 days.

(21) Appl. No.: 11/151,518

(22) Filed: Jun. 14, 2005

(65) Prior Publication Data

US 2006/0278447 A1    Dec. 14, 2006

(51) Int. Cl.
*B62D 51/04* (2006.01)
(52) U.S. Cl. .................. 180/19.1; 180/19.2; 180/19.3; 180/15; 180/16; 180/11; 180/12; 180/13; 180/199; 180/200; 180/201; 180/202; 180/203
(58) Field of Classification Search .............. 180/19.1, 180/19.2, 19.3, 15, 16, 11, 12, 13, 199, 200, 180/201, 202, 203
See application file for complete search history.

(56) References Cited

U.S. PATENT DOCUMENTS

| | | | |
|---|---|---|---|
| 3,452,371 A * | 7/1969 | Hirsch ........................ 5/87.1 |
| 4,584,989 A * | 4/1986 | Stith ........................... 600/18 |
| 6,230,343 B1 * | 5/2001 | Buiskool et al. ............... 5/610 |
| 6,264,006 B1 * | 7/2001 | Hanson et al. ............. 188/1.12 |
| 6,588,523 B2 * | 7/2003 | Heimbrock et al. ....... 180/65.5 |
| 6,598,247 B1 * | 7/2003 | Heimbrock et al. .......... 5/86.1 |
| 6,874,800 B2 * | 4/2005 | George ........................ 280/99 |
| 7,007,765 B2 * | 3/2006 | Waters et al. .............. 180/19.3 |
| 7,100,722 B2 * | 9/2006 | Bowen ....................... 180/65.5 |

* cited by examiner

*Primary Examiner*—Lesley D. Morris
*Assistant Examiner*—Marlon Arce-Diaz
(74) *Attorney, Agent, or Firm*—Troxell Law Office, PLLC

(57) ABSTRACT

A hospital bed includes a carrier frame, a driven wheel unit disposed below the frame, a motor unit, a drive wheel unit disposed below the frame and coupled operably to the motor unit in such a manner that actuation of the motor unit results in rotation of the drive wheel unit. A lifting-and-lowering device interconnects the frame and the drive wheel unit for lowering and lifting the drive wheel unit with respect to the driven wheel unit between an upper position, in which, the drive wheel unit is disposed at an elevation above the driven wheel unit, and a lower position, in which lower surfaces of the driven and drive wheel units are flush with each other.

9 Claims, 9 Drawing Sheets

HOSPITAL BED HAVING A DRIVE WHEEL UNIT

FIELD OF THE INVENTION

The present invention relates to a carrier, more particularly to a carrier, such as a hospital bed having a carrier frame and a drive-wheel unit for moving the carrier frame when desired.

BACKGROUND OF THE INVENTION

Due to rapid innovation of transportation technology, plenty of portable transport vehicles are used widely in order to transport things (especially heavy load) from one place to the other. For instance, a movable bed is an indispensable article in a hospital for transporting a patient (who is usually inconvenient to walk by itself) from one place to another, like taking the patient from the ward to an operation room or an X-ray room and vice versa.

Referring to FIG. 1, a perspective view of a conventional hospital bed is shown to include a carrier frame 10, four casters 11 mounted rotatably to four corners of the carrier frame 10, and left and right safety rails 12 mounted at two opposite sides of the carrier frame 10. The safety rails 12 can be lifted upward in order to prevent falling of the patient from the carrier frame 10. Alternately, the safety rails 12 can be lowered to facilitate descending of the patient from the carrier frame 10.

One drawback of the aforesaid conventional hospital bed resides in that the carrier frame 10 needs to be moved manually. Manually moving the carrier frame 10 is laborious, thereby causing inconvenience to the medical staff, who already has to burden overwork due to short stuff. Since the walking path in the hospital is not very large due to limited area, the number of the medical staff moving the carrier frame 10 may block the walking path or cause traffic jam, thereby bringing uncomfortable feelings to the nearby persons who are happened to be around the carrier frame 10.

SUMMARY OF THE INVENTION

The object of the present invention is to provide a powered carrier, such as a hospital bed having a drive wheel unit for mechanically moving the carrier frame when required, thereby eliminating the drawbacks encountered during use of the conventional hospital bed.

A hospital bed is provided in accordance with the present invention to include: a carrier frame; at least one driven wheel unit disposed below the carrier frame for supporting the carrier frame thereabove; a motor; a drive wheel unit disposed below the carrier frame and coupled operably to the motor in such a manner that actuation of the motor results in rotation of the drive wheel unit, thereby moving the carrier frame about; and a lifting-and-lowering device for lowering and lifting the drive wheel unit with respect to the driven wheel unit between an upper position, in which, the drive wheel unit is disposed at an elevation above the driven wheel unit, and a lower position, in which lower surfaces of the driven and drive wheel units are flush with each other.

The aforesaid hospital bed further includes a lifting-and-lowering device. When it is desired to mechanically move the carrier frame, the drive wheel unit is lowered to the lower position by means of the lifting-and-lowering device, wherein the carrier frame is moved mechanically upon actuation of the motor. For manually moving the carrier frame, the drive wheel unit can be moved to the upper position by means of the lifting-and-lowering device so as to eliminate the friction generated due to engagement between the drive wheel unit and the ground surface when the former is at the lower position.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1:
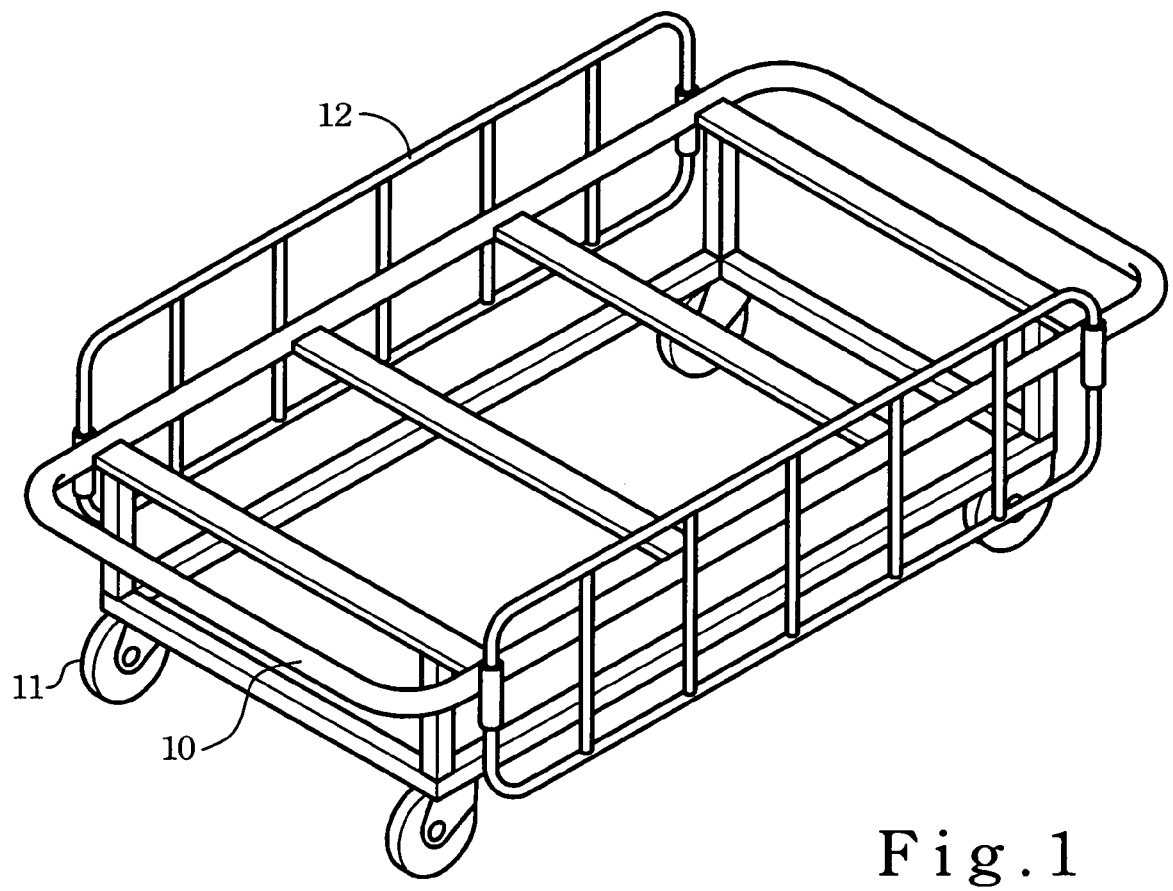
FIG. 1 is a perspective view of a conventional hospital bed.
Figure 2:
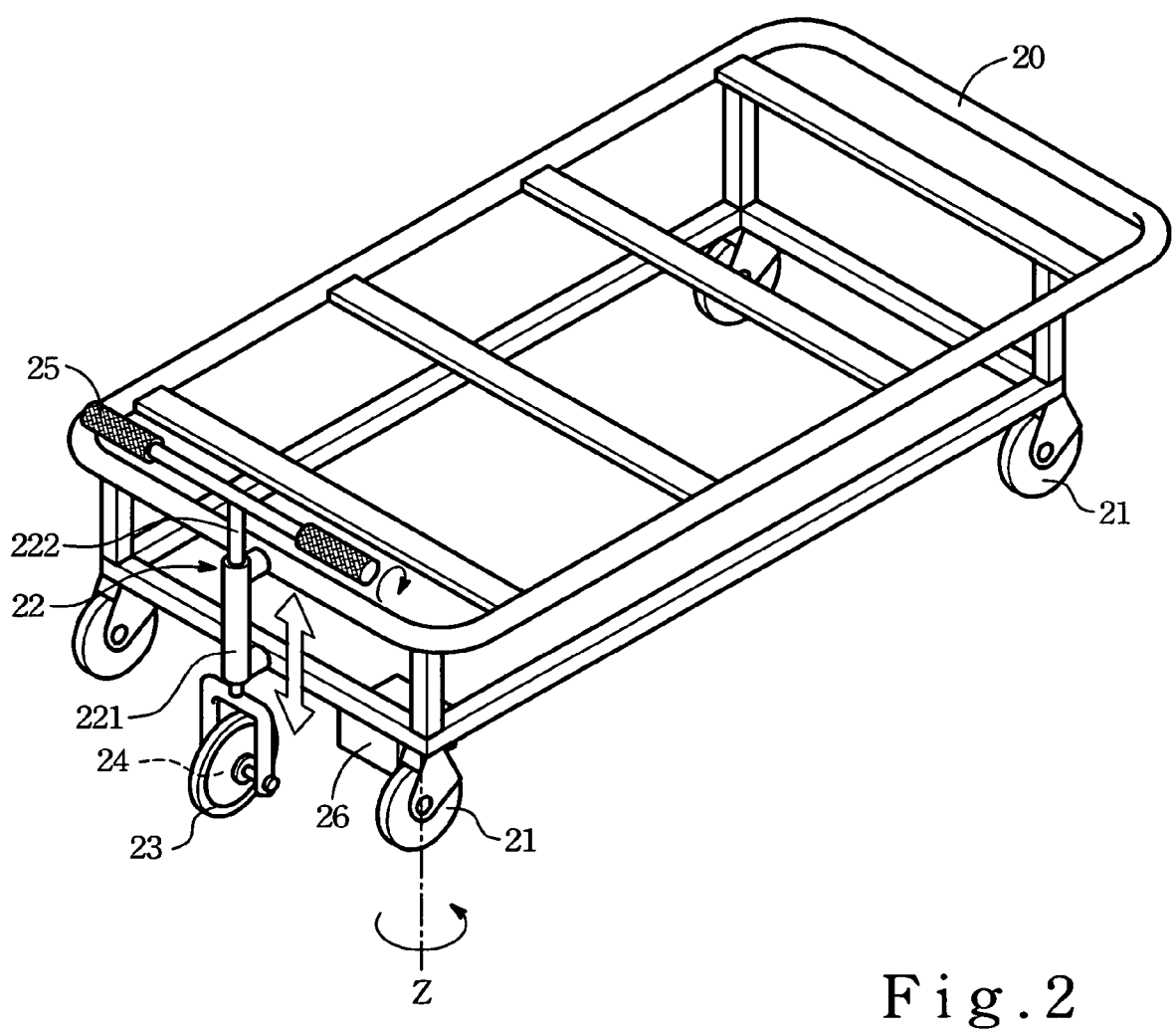
FIG. 2 is a perspective view of the first embodiment of a hospital bed according to the present invention.
Figure 3:
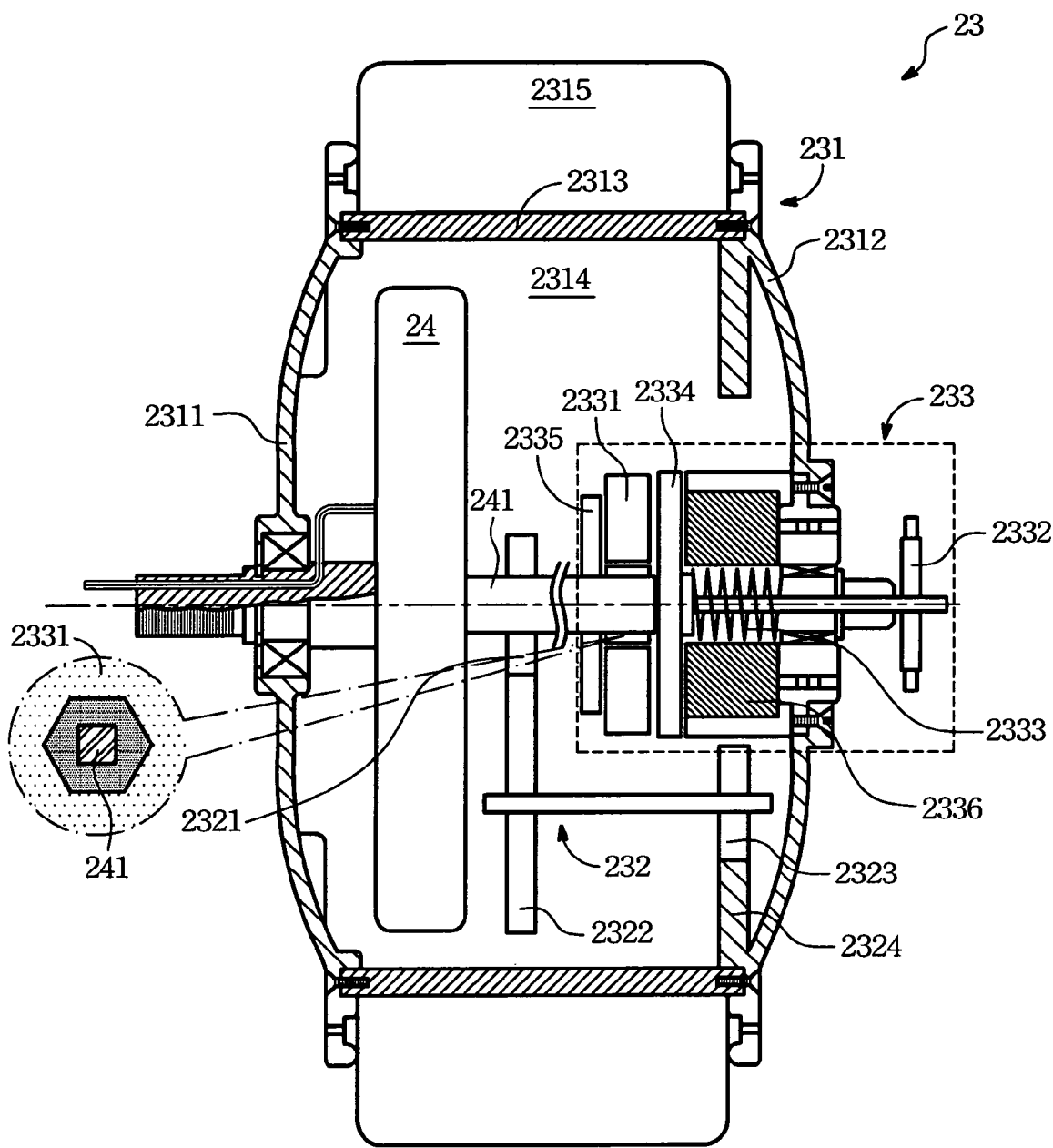
FIG. 3 is a fragmentary sectional view, illustrating interrelation between a drive wheel unit and a motor in the first embodiment of the hospital bed according to the present invention.

Referring to FIG. 2, a perspective view of the first embodiment of a hospital bed according to the present invention is used in the hospital for transporting patient from one place to the other. Alternately, the bed is used in the patient ward. The first embodiment includes a rectangular carrier frame 20, a driven wheel unit consisting of four casters 21, a lifting-and-lowering device 22, a drive wheel unit 23, a motor unit 24, a steering mechanism 25, and a power source 26 (generally a battery).

The carrier frame 20 is generally rectangular, and has a bottom portion. The casters 21 are mounted rotatably at four corners of the bottom portion in such a manner that the casters 21 are rotatable about the vertical axes Z so that the carrier frame 20 can be moved in a direction by virtue of manual operation.

The lifting-and-lowering device 22 includes a steering mechanism 25, a holding post 221, and a fork unit 222. The holding post 221 is secured to one end of the carrier frame 20 in such a manner that the post 221 extends transversely to a longitudinal length of the carrier frame 20. The fork unit 222 is slidably mounted within the holding post 221. The drive wheel unit 23 is journalled to a lower end of the fork unit 222. The specific structure of the lifting-and-lowering device 22 will be explained latter. By using the lifting-andlowering device 22, the drive wheel unit 23 is movable vertically with respect to the casters 21 between an upper position, in which, the drive wheel unit 23 is disposed at an elevation above the casters 21 (partly visible in FIG. 6A), and a lower position, in which lower surfaces of the drive wheel unit 23 and the casters 21 are flush with each other since the lower surfaces thereof are in contact with the ground surface (see FIG. 2). In this embodiment, the steering mechanism 25 is a handle mounted at the top end of the fork unit 222 for preventing deviation of the carrier frame 20 from its moving direction. In order to facilitate lifting and lowering of the drive wheel unit 23, the inner surface of the holding post 221 is formed with internal thread while the outer surface of the fork unit 222 is formed with external thread meshing with the internal thread such that turning of the handle 25 in clockwise and counter clockwise directions can result in lifting and lowering of the drive wheel unit 23. In addition, the fork unit 222 may include an upper part formed with the external thread for meshing with the holding post 221, and a lower part pivotally connected to the upper part such that vertical movement of the upper part to an upper position and folding the upper part at that upper position can result in lifting the lower part to the upper position (hence lifting the drive wheel unit 23 to the upper position).

The drive wheel unit 23 includes a motor unit 24, a hub housing 231 and a tire wheel 2315 sleeved securely around the hub housing 231. Preferably, the hub housing 231 includes an annular body 2313, and left and right side walls 2311, 2312 coupled to the annular body 2313 to define a receiving space 2314 thereamong. The motor unit 24 is disposed within the hub housing 231, and is coupled operably the hub housing 231 in such a manner that actuation of the motor 24 unit results in rotation of the drive wheel unit 23, which, in turn, results rotation of the casters 21, thereby moving the carrier frame 20. The battery 26 is mounted on the carrier frame 20 for supplying electrical power required by the motor unit 24.

The motor unit 24 includes a motor having an output shaft 241 serving as the axle of the drive wheel unit 23, a speed reduction system 232, a brake assembly 233, and a power modulator (not visible). The power modulator is electrically connected to the motor for modulating amount of current supplied into the motor, and includes a coupler shaft projecting outwardly from the hub housing 231. The operating knob 2332 is mounted securely an outer end of the coupler shaft, and is disposed outwardly of the hub housing 231. Turning of the operating knob 2332 can regulate the current supplied into the motor. The speed reduction system 232 includes a central gear 2321, a first gear 2322, a second gear 2323 and a drive gear 2324. The central gear 2321 is fixed securely on the output shaft 241. The first gear 2322 is fixed on one end of the coupler shaft and meshes with the central gear 2321. The second gear 2323 is fixed on the other end of the coupler shaft, and meshes with the drive gear 2324 which, in turn, is secured on the right side wall 2312 of the hub housing 231. Under this condition, actuation of the motor unit 24 results in a torque by virtue of the speed reduction system 232 in order to drive the hub housing 231 (hence the tire wheel 2315). When manually pushing the hospital bed of the present invention, the drive wheel units 23 is lifted to the upper position at first, since the drive wheel units 23 at the lower position generates friction due to engagement with the ground surface. The friction may hinder smooth movement of the hospital bed.

The brake assembly 233 is disposed within the hub housing 231, and is secured to the right side wall 2312. The brake assembly 233 includes a movable axle extending through the hub housing 231, a stationary seat 2335, a movable brake pad 2331, a compression spring 2333, a stopping pad 2334, and a magnetic coil member 2336. The stationary seat 2335 is disposed adjacent to the output shaft 241. The brake pad 2331 is sleeved slidably on the output shaft 241 via a polygonal nut, and is rotatable together with the output shaft 241. The stopping pad 2334 is sleeved slidably on the output shaft 241. The magnetic coil member 2336 is disposed adjacent to the movable brake pad 2331 opposite to the brake pad 2331, and is sleeved around the axle. The compression spring 2333 is disposed within the coil member 2336 around the axle in such a manner to urge the stopping pad 2334 toward the stationary seat 2335 in a normal condition (when no current is supplied into the motor), thereby frictionally clamping the brake pad 24 between the stationary seat 2335 and the stopping pad 2334 to prevent rotation of the hub housing 231. Once the current is supplied into the motor, the stopping pad 2334 is adapted to be drawn toward the coil member 2336 by virtue of the electromagnetic field and against the urging action of the spring 2333, thereby releasing the brake pad 2331 from being clamped to permit rotation of the hub housing 231. A brake assembly of other structure can also be used in this embodiment; the scope of the present invention should not be limited only in the above structure. Note that rotation of the operating knob 2332 can result in variation of the axial length of the compression spring 2333, which, in turn, results in changing the rotation speed of the drive wheel unit 23.

Figure 4:
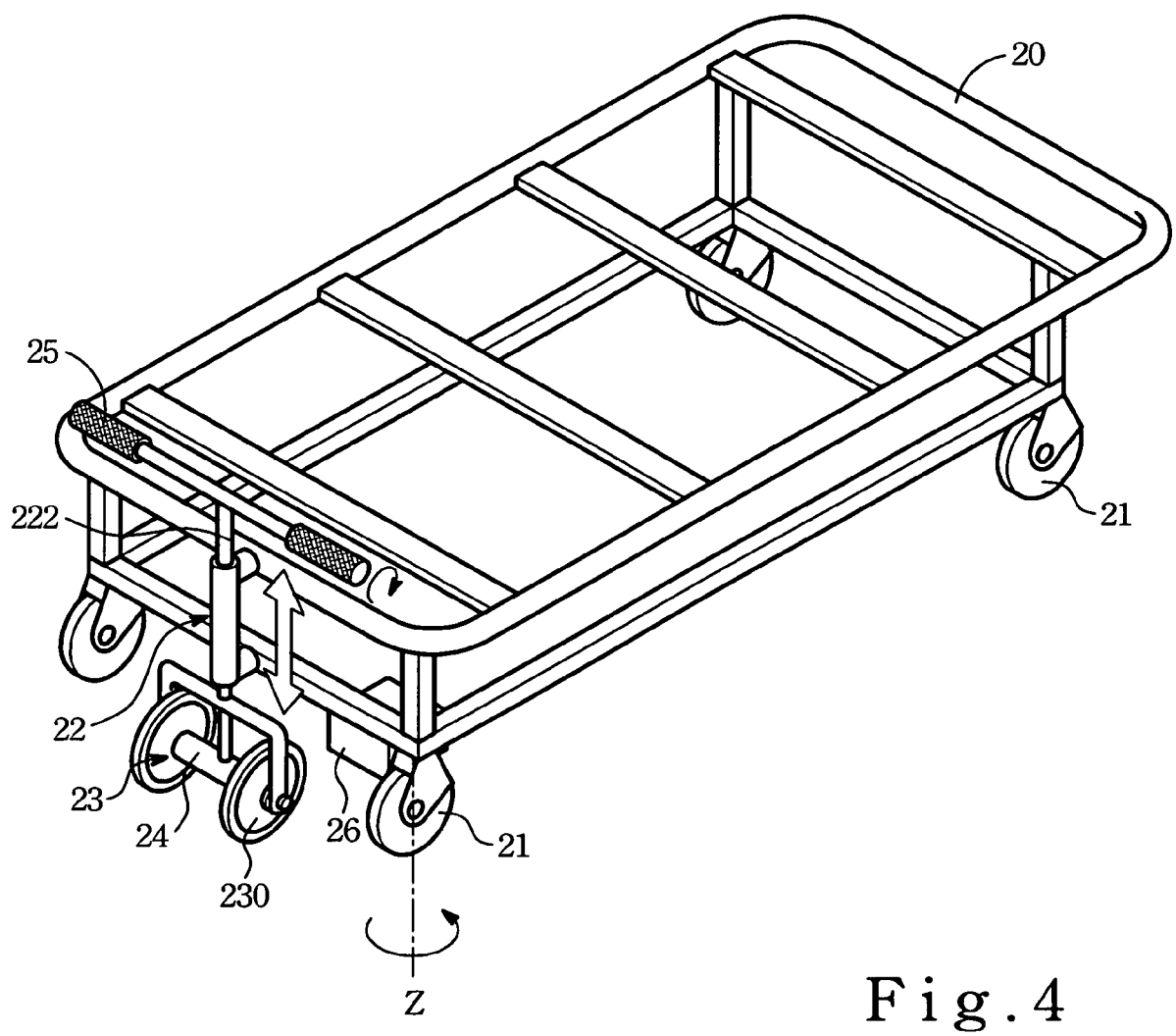
FIG. 4 is a perspective view of the second embodiment of the hospital bed according to the present invention.

FIG. 4 is a perspective view of the second embodiment of the hospital bed according to the present invention, and has the structure similar to the first embodiment. The only difference resides in that the drive wheel unit 23 includes two drive wheels 230 mounted rotatably at the lower end of the fork unit 222. The motor unit 24 is disposed between and interconnects the drive wheels 230.

Figure 5A:
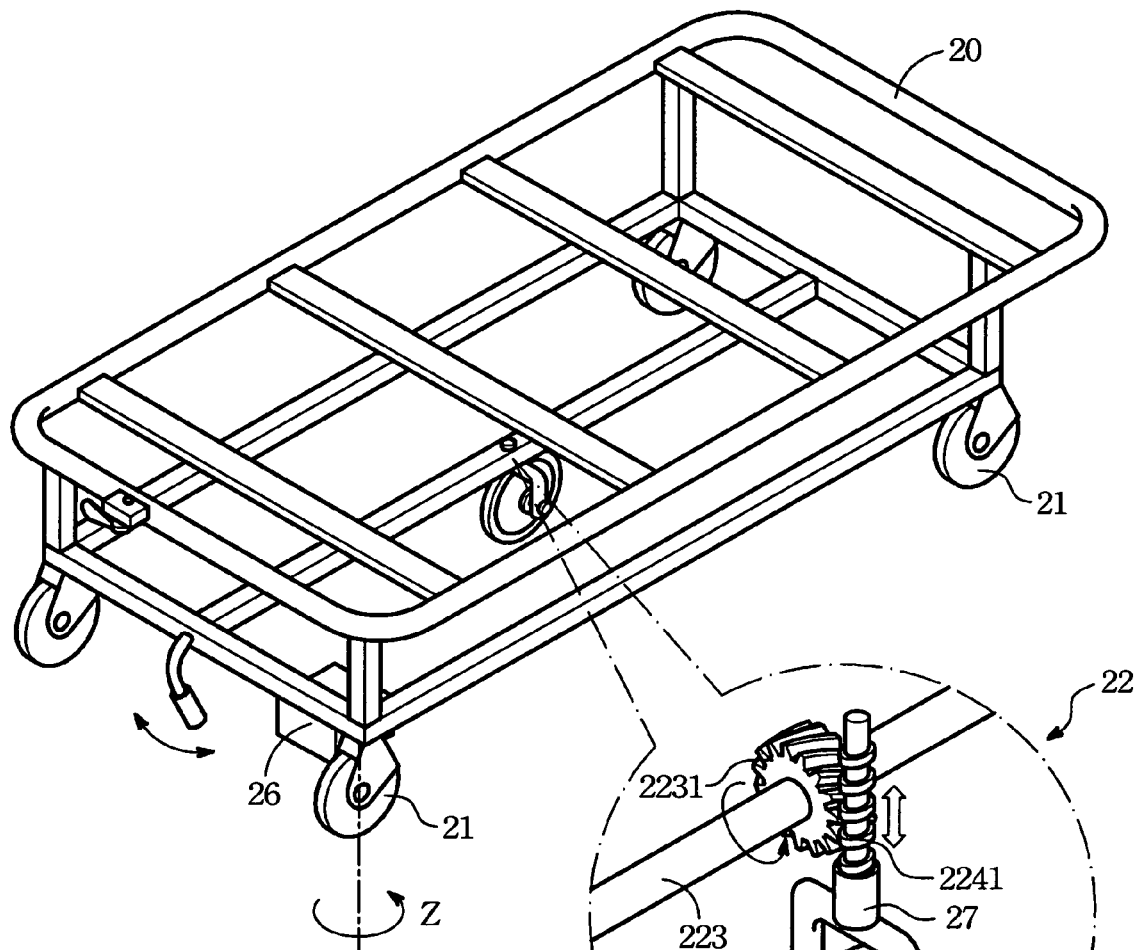
FIG. 5A is a perspective view of the third embodiment of the hospital bed according to the present invention.
Figure 5C:
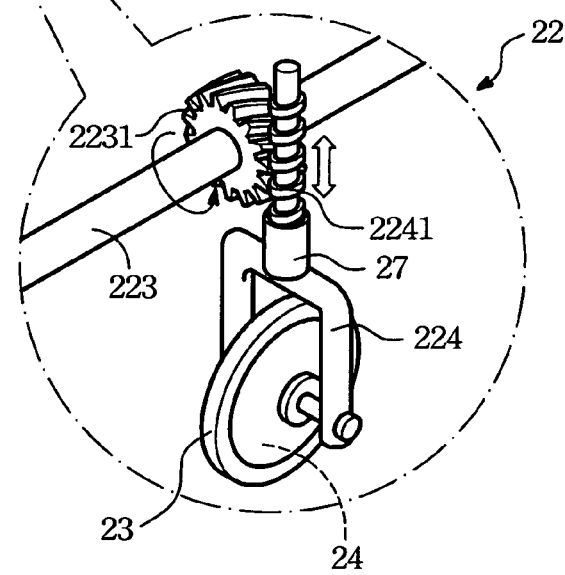
FIG. 5C is a fragmentary perspective view, illustrating how the fork unit and the drive wheel unit are mounted to a carrier frame in the third embodiment of the hospital bed according to the present invention.
Figure 5B:
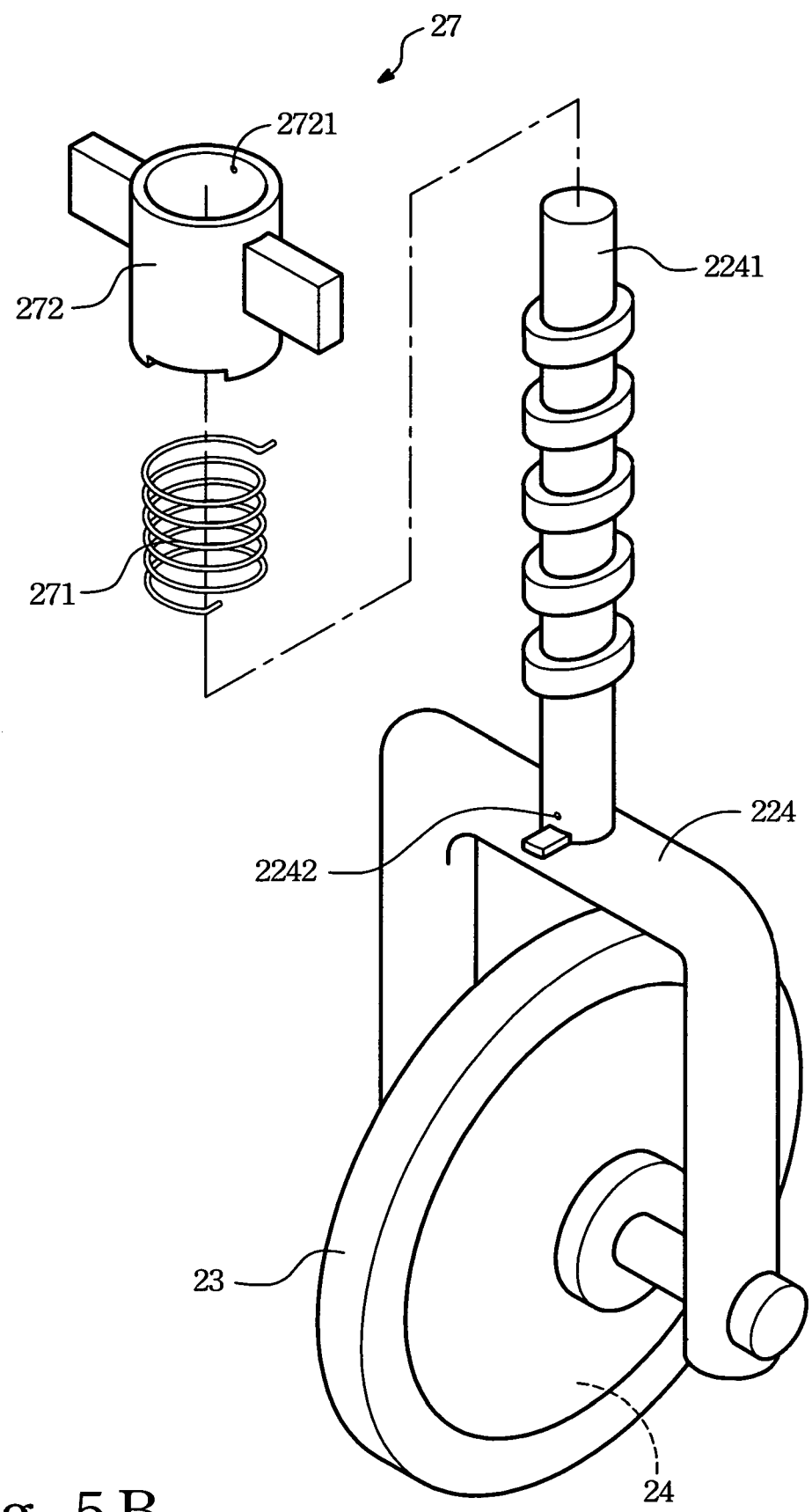
FIG. 5B is a perspective enlarged view of a fork unit and a drive wheel unit employed in the third embodiment of the hospital bed according to the present invention.

FIG. 5A is a perspective view of the third embodiment of the hospital bed according to the present invention, and has the structure similar to the first embodiment. The only difference resides in that the lifting-and-lowering device 22 includes a holding shaft 223 disposed rotatably below to the carrier frame 20 in such a manner that the holding shaft 223 extends parallel to the carrier frame 20. A worm gear 2231 is fixed on the holding shaft 223 (see FIG. 5C). The fork unit has an upper threaded portion 2241 meshed with the worm gear 2231 and a lower portion 224. The drive wheel unit 23 is journalled to the lower portion 224 (see FIG. 5B) of the fork unit such that rotation of the holding shaft 223 results in lifting and lowering of the drive wheel unit 23 between the upper and lower positions. The steering mechanism 27 interconnects the fork unit and the holding tube 272 to define an orientation of the drive wheel unit 23. The holding tube 272 is sleeved non-rotatably on the lower portion 224 of the fork unit. The steering mechanism 27 preferably includes a helical spring 271 having a lower end inserted into a retention hole 2242 in the lower portion 224 of the fork unit and an upper end inserted into the retention hole 2721 in the holding sleeve 272. The outward biasing force provided by the helical spring 271 prevents deviation of the drive wheel unit 23 from the moving direction.

Figure 6A:
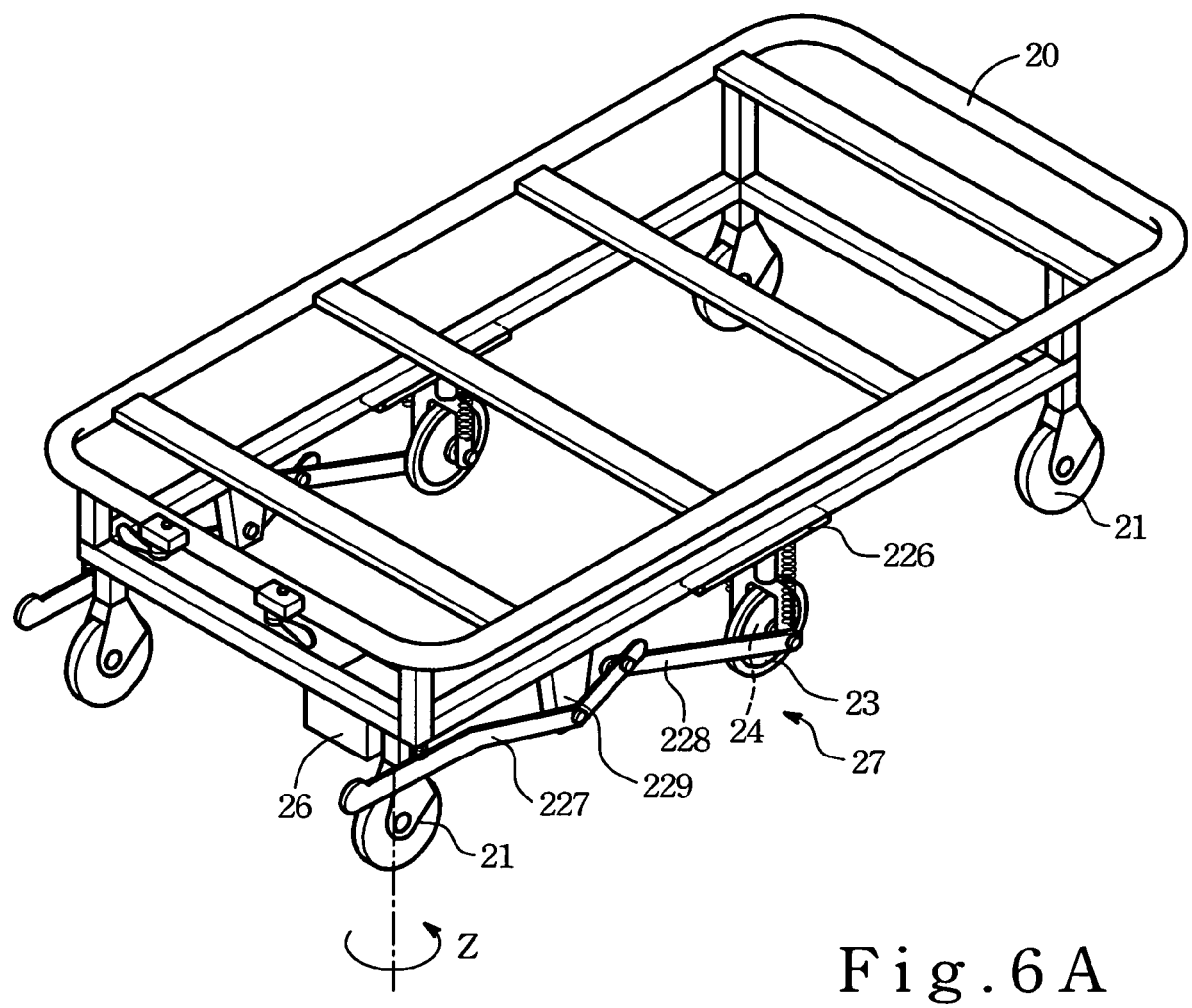
FIG. 6A is a perspective view of the fourth embodiment of the hospital bed according to the present invention.
Figure 6B:
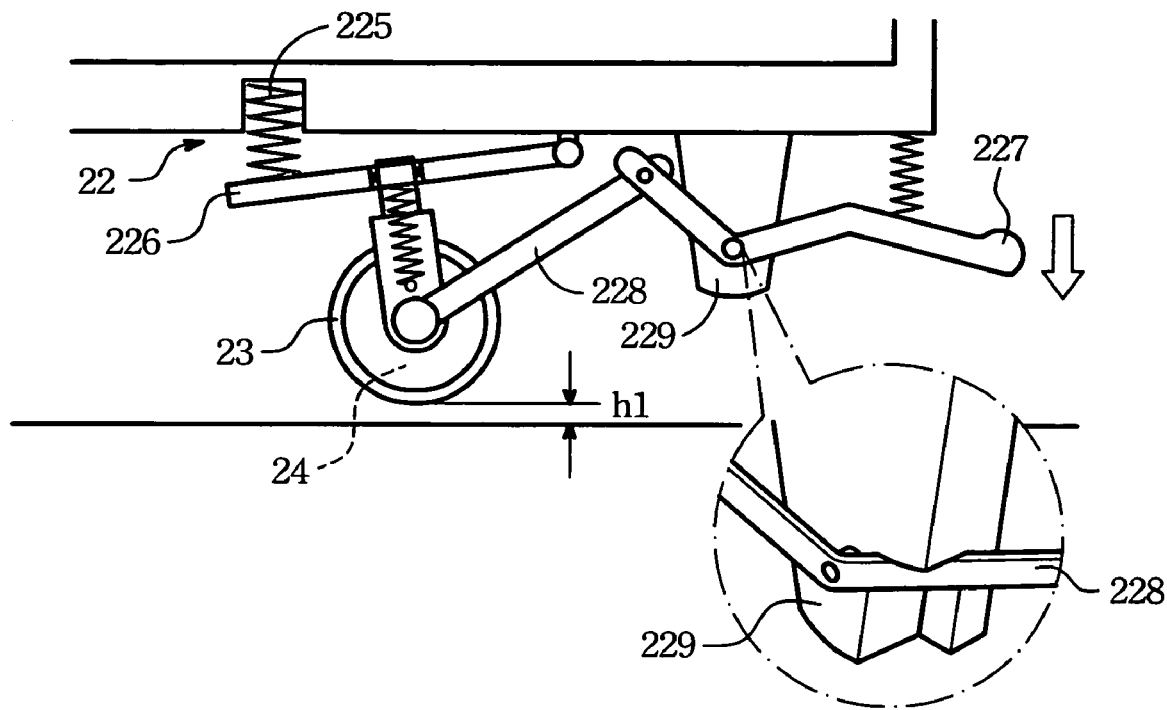
FIG. 6B is a side view of the fourth embodiment of the hospital bed according to the present invention.
Figure 6C:
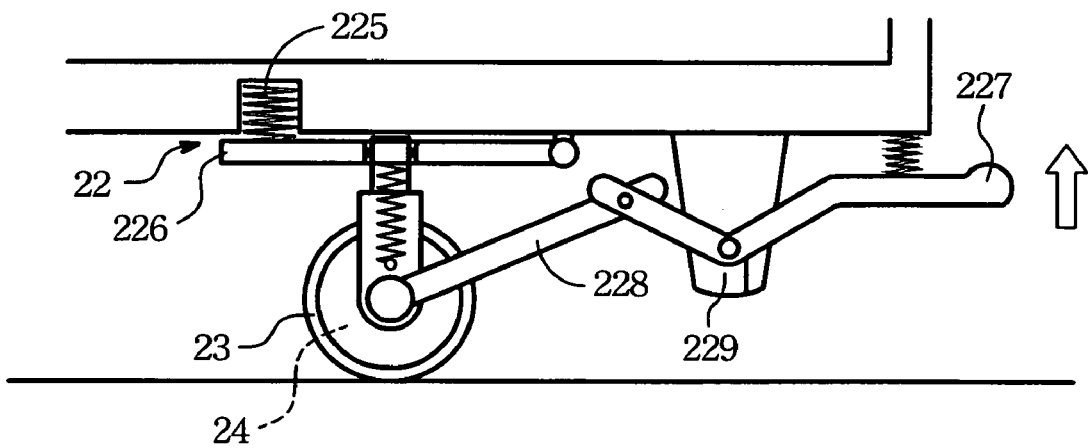
FIG. 6C is another side view of the fourth embodiment of the hospital bed according to the present invention.
Figure 6D:
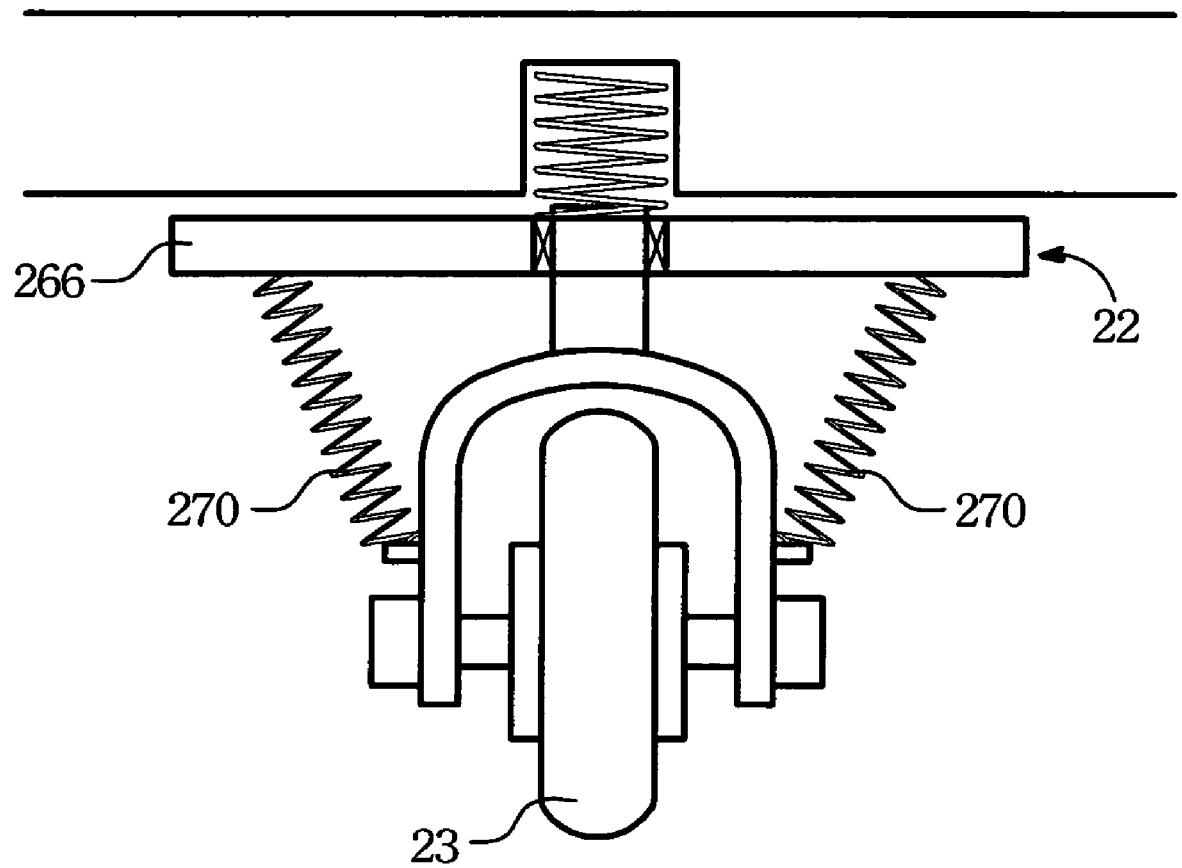
FIG. 6D is a fragmentary front view of the fourth embodiment of the hospital bed according to the present invention.

FIG. 6A is a perspective view of the fourth embodiment of the hospital bed according to the present invention, and has the structure similar to the first embodiment. The only difference resides in that the lifting-and-lowering device 27 includes two crank units 227 and two holding blocks 226 pivotally connected to two opposite sides of the carrier frame 20 in such a manner that the holding blocks 229 extend generally parallel to the carrier frame 20, and two fork units extending downwardly and respectively from the holding blocks 226. Each of the fork units has a lower portion 224 upon which a respective drive wheel unit 23 is journalled. Two crank-mounting posts 229 extend downwardly and respectively from the opposite sides of the carrier frame 20, are spaced respectively apart from the fork units 27. Each crank unit 227 has a first end pivoted to the respective drive wheel unit 23 via a linking crank 228, a second end, and an intermediate portion that is pivoted to a respective crank-mounting post 229 in such a manner that pedaling action of the second end results in lifting of the drive wheel units 23 with respect to the casters 21 to a higher elevation, where the drive wheel units 23 are spaced apart from the ground surface (see FIG. 6B) at a distance h1, and a lowering position, where the drive wheel units 23 contact the ground surface (see FIG. 6C). Two shock-absorbing springs 225 are mounted in the bottom recesses in the carrier frame 20, and abut respectively against the holding blocks 226 in order to absorb shock resulted due to collision of the drive wheel units 23 against an obstacle (not shown). The steering mechanism preferably includes two spring sets, each set has left and right spring members 270 interconnecting the opposite sides of the respective drive wheel unit 23 and the respective holding block 266 in order to define an orientation of the drive wheel unit 23 (see FIG. 6D).

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A hospital bed comprising:
  a carrier frame;
  at least one driven wheel unit disposed below said carrier frame;
  a drive wheel unit disposed below said carrier frame, and having a motor unit coaxially coupled and rotated in such a manner that actuation of said motor unit results in rotation of said drive wheel unit; and
  a lifting-and-lowering device including a holding shaft disposed below to said carrier frame in such a manner that said holding shaft extends parallel to said carrier frame, a first gear fixed securely on said holding shaft, and a fork unit having upper threaded portion meshed with said first gear and a lower portion, said drive wheel unit being journalled to said lower portion of said fork unit such that rotation of said holding shaft results in lowering and lifting said drive wheel unit between an upper position and a lower position.

2. The hospital bed according to claim 1, wherein when said drive wheel unit is at said upper position, said drive wheel unit is disposed at an elevation above said driven wheel unit.

3. The hospital bed according to claim 1, wherein when said drive wheel unit is at said lower position, lower surfaces of said drive wheel unit and said driven wheel unit are flush with each other by virtue of a support ground surface.

4. The hospital bed according to claim 1, wherein said first gear is a worm gear.

5. The hospital bed according to claim 1, further comprising a brake unit operable by electromagnetic means for stopping rotation of said drive wheel unit.

6. The hospital bed according to claim 1, further comprising a power modulator electrically connected to said motor unit for modulating amount of current supplied into said motor unit.

7. The hospital bed according to claim 5, wherein said power modulator includes a coupler shaft projecting outwardly from said motor unit and an operating knob mounted on an outer end of said coupler shaft such that turning of said operating knob can regulate current supplied into said motor unit.

8. The hospital bed according to claim 1, wherein said carrier frame defines a moving direction, the hospital bed further comprising a steering mechanism for preventing deviation of said carrier frame from said moving direction.

9. A hospital bed comprising:
  a carrier frame;
  at least one driven wheel unit disposed below said carrier frame;
  a drive wheel unit disposed below said carrier frame, and having a motor unit coaxially coupled and rotated in such a manner that actuation of said motor unit results in rotation of said drive wheel unit;
  a lifting-and-lowering device for lowering and lifting said drive wheel unit between an upper position and a lower position; and
  a brake unit operable by electromagnetic means for stopping rotation of said drive wheel unit,
  wherein said power modulator includes a coupler shaft projecting outwardly from said motor unit and an operating knob mounted on an outer end of said coupler shaft such that turning of said operating knob can regulate current supplied into said motor unit.

* * * * *